(12) United States Patent
Suetsugu et al.

(10) Patent No.: US 8,734,992 B2
(45) Date of Patent: May 27, 2014

(54) ELECTROLYTIC MANGANESE DIOXIDE, AND METHOD FOR ITS PRODUCTION AND ITS APPLICATION

(75) Inventors: Kazumasa Suetsugu, Yamaguchi-ken (JP); Shin Kumagai, Shunan (JP); Hiroshi Miura, Shunan (JP)

(73) Assignee: Tosoh Corporation, Yamaguchi-Ken (JP)

( * ) Notice: Subject to any disclaimer, the term of this patent is extended or adjusted under 35 U.S.C. 154(b) by 1251 days.

(21) Appl. No.: 12/025,264

(22) Filed: Feb. 4, 2008

(65) Prior Publication Data

US 2008/0193847 A1    Aug. 14, 2008

(30) Foreign Application Priority Data

Feb. 14, 2007  (JP) ................................ 2007-034066
Nov. 8, 2007   (JP) ................................ 2007-291038
Nov. 8, 2007   (JP) ................................ 2007-291039

(51) Int. Cl.
*H01M 4/50*    (2010.01)

(52) U.S. Cl.
USPC ............ 429/224; 429/223; 205/539; 423/605

(58) Field of Classification Search
CPC .......... H01M 4/50; H01M 4/505; H01M 4/52
USPC ................... 429/224, 223; 205/539; 423/605
See application file for complete search history.

(56) References Cited

U.S. PATENT DOCUMENTS

| 4,818,354 | A | 4/1989 | Preisler et al. | |
|---|---|---|---|---|
| 4,863,817 | A * | 9/1989 | Ogino et al. | 429/224 |
| 6,527,941 | B2 | 3/2003 | Andersen et al. | |
| 6,589,693 | B1 * | 7/2003 | Kilby et al. | 429/224 |
| 2001/0031239 | A1* | 10/2001 | Andersen et al. | 423/605 |
| 2002/0046955 | A1* | 4/2002 | Takahashi et al. | 205/539 |
| 2005/0019658 | A1 | 1/2005 | Noya et al. | |
| 2007/0287067 | A1* | 12/2007 | Takahashi et al. | 429/224 |

FOREIGN PATENT DOCUMENTS

| JP | 63-21224 | 1/1988 |
|---|---|---|
| JP | 2006-108083 | 4/2006 |
| JP | 2007-141643 | 6/2007 |
| WO | 02/052067 | 7/2002 |

OTHER PUBLICATIONS

Andersen, T.,N. et al. "Comparison of pH 6 potential and initial circuit voltages of electrolytic MnO2" Journal of Applied Electrochemistry 2003, 33, 717-723.*

(Continued)

*Primary Examiner* — Patrick Ryan
*Assistant Examiner* — Alex Usyatinsky
(74) *Attorney, Agent, or Firm* — Greenblum & Bernstein, P.L.C.

(57) ABSTRACT

Disclosed is an electrolytic manganese dioxide having an alkali potential of at least 310 mV, a full width at half maximum of the (110) plane in the XRD measurement using the $CuK_\alpha$ line as the light source of from 2.2° to 3.0°, and a (110)/(021) peak intensity ratio in the X-ray diffraction spectrum of from 0.5 to 0.80. Also disclosed is a method for producing electrolytic manganese dioxide by electrolysis in an aqueous solution of a sulfuric acid/manganese sulfate mixture.

18 Claims, 4 Drawing Sheets

(56) References Cited

OTHER PUBLICATIONS

Chemical Abstracts No. 74:150101 of Kano et al., "Electrolytic Preparation of Managanese Dioxide. II. Effect of Concentration of Sulfuric acid on Characteristics of Electrodeposited Manganese Dioxide." Denki Kagaku, vol. 38, No. 12, pp. 932-938, 1970.

Shimizu et al., Furukawa Denko Report, No. 43, pp. 91-102, May 1967.
English language Abstract of JP 2007-141643.
English language Abstract of JP63-21224.

* cited by examiner

ELECTROLYTIC MANGANESE DIOXIDE, AND METHOD FOR ITS PRODUCTION AND ITS APPLICATION

BACKGROUND OF THE INVENTION

1. Field of the Invention

The present invention relates to electrolytic manganese dioxide to be used as a cathode active material in e.g. manganese dry cells, particularly alkali-manganese dry cells, and a method for its production and its application.

2. Discussion of Background Information

Manganese dioxide is known as a cathode active material for e.g. manganese dry cells or alkali-manganese dry cells and has advantages such that it is excellent in storage stability and inexpensive. In particular, the alkali-manganese dry cells employing manganese dioxide as a cathode active material, are excellent in the discharge characteristics under heavy loading. Thus, they are widely used in applications ranging from digital cameras, portable tape recorders and portable information apparatus to game machines and toys, and there is a rapidly growing demand for them.

However, alkali-manganese dry cells have had a problem such that the utilization rate of manganese dioxide as a cathode active material decreases with the increase of the discharge current and manganese dioxide can't use in such low discharge voltage condition whereby the discharge capacity will be substantially impaired. Namely, the alkali-manganese dry cells have had a drawback that when they are used in apparatus using a large current (for high rate discharge), manganese dioxide packed as a cathode active material is not sufficiently utilized, and the useful time is short.

Therefore, excellent manganese dioxide capable of providing a high capacity and long useful life even under such a high rate pulse discharge condition that a large current is taken out in a short period of time, i.e. manganese dioxide excellent in a so-called high rate discharge characteristic, is desired.

In applications where the high rate discharge characteristic is required, electrolytic manganese dioxide having a high potential (hereinafter referred to as alkali potential) as measured in a 40% KOH aqueous solution by using a mercury/mercury oxide reference electrode as a standard, has been used as a cathode active material in order to increase the voltage at the time of the discharge of the cell. However, the alkali potential of conventional electrolytic manganese dioxide has not yet been sufficiently high.

Further, as electrolytic manganese dioxide having a high alkali potential, electrolytic manganese dioxide obtained by controlling the electrolytic conditions, e.g. electrolytic manganese dioxide produced by using the electrolyte containing the high acid concentration of sulfuric acid, has been proposed (Non-patent Document 1, Patent Document 1). However, in electrolysis under a production condition where the acid concentration in the electrolyte is high, electrolytic manganese dioxide electrodeposited during the electrolysis will exfoliate from the electrode for electrolysis, whereby electrolytic manganese dioxide can not constantly be produced, and the obtainable electrolytic manganese dioxide tends to have a small crystallite diameter and a large BET surface area, whereby the packing efficiency in a cell can not sufficiently be improved, and there has been a problem that the volume energy density is low.

On the other hand, a method for producing electrolytic manganese dioxide having a high alkali potential by electrolysis at a low current density has been reported (Patent Document 2). However, the electrolytic manganese dioxide by the electrolysis at a low current density has had a problem such that the electrodeposition speed is slow whereby the productivity is low, and the crystallite diameter of the electrolytic manganese dioxide tends to be too large, whereby the reactivity of the electrolytic manganese dioxide tends to be poor, and the discharge capacity as a cathode active material for cells tends to decrease.

Further, a method for producing manganese dioxide having a high alkali potential has been proposed wherein hydrochloric acid is used instead of sulfuric acid which is commonly used in the electrolyte (Patent Document 1). However, in the electrolysis using hydrochloric acid, there will be many inconveniences from the viewpoint of the production such that chlorine is generated during the electrolysis, and a further countermeasure is required, and there have been problems that the electrolytic manganese dioxide thereby obtainable has a small crystallite diameter, whereby the packing property in a cell can not be improved, and the volume energy density is low.

Further, the electric discharge of electrolytic manganese dioxide in alkali-manganese cells is known to proceed by the formula (1) to obtain a proton ($H^+$) from water ($H_2O$).

$$MnO_2 + H_2O + e^- \rightarrow MnOOH + OH^- \qquad (1)$$

Particularly, in the high rate discharge, quick dispersion of $H^+$ in electrolytic manganese dioxide is necessary, and for that purpose, it is effective that it has many $H^+$ in its structure. $H^+$ in the electrolytic manganese dioxide is present in the structure in the form of a hydroxyl group (—OH) or crystal water ($H_2O$), and among such a hydroxyl group or water of crystallization (excluding adhesive moisture), water ($H_2O$) to be desorbed under a certain heating condition is referred to as structural water.

Heretofore, as a method to obtain electrolytic manganese dioxide having a high alkali potential, a method of treating electrolytic manganese dioxide with a sulfuric acid solution, has been reported (Patent Document 3). However, the manganese dioxide obtained by such conventional sulfuric acid treatment did not have a sufficiently high alkali potential.

Further, as electrolytic manganese dioxide excellent in the high rate discharge characteristic, electrolytic manganese dioxide having a potential of at least 250 mV and having a composition wherein the molar ratio of H to Mn in the structure is at least 0.30 and at most 0.40, is is known wherein the molar ratio of structural water to manganese in the electrolytic manganese dioxide is at least 0.15 and at most 0.20 (Patent Document 4). However, the alkali potential of electrolytic manganese dioxide obtained by such a method was at most 300 mV, which was insufficient to satisfy the required high rate discharge characteristic.

Further, as electrolytic manganese dioxide excellent in discharge characteristics, electrolytic manganese dioxide is reported wherein the (110)/(021) peak intensity ratio is larger than 0.50 and less than 0.70, and the (221)/(021) peak intensity ratio is less than 0.70 (Patent Document 1). The discharge characteristics of manganese dioxide disclosed therein showed some effects with respect to the discharge capacity under low loading of 30 mA, but they were no more than the characteristics which were not substantially different from the conventional products in constant current discharge of 500 mA.

| Non-patent Document 1: | Furukawa Denko Report, No. 43, p. 91-102 (May, 1967) |
|---|---|
| Patent Document 1: | JP-A-2007-141643 |
| Patent Document 2: | U.S. Pat. No. 6,527,941 |

| Patent Document 3: | JP-A-63-21224 |
| --- | --- |
| Patent Document 4: | JP-A-2006-108083 |

SUMMARY OF THE INVENTION

It is an object of the present invention to provide electrolytic manganese dioxide which is manganese dioxide to be used as a cathode active material for an alkali-manganese dry cell excellent particularly in the high rate discharge characteristic and which has a high potential particularly in an alkaline electrolyte and is provided with a high reactivity and packing efficiency, and a method for its production and its application.

As a result of an extensive study on manganese dioxide to be used as a cathode active material particularly for alkali-manganese dry cells, the present inventors have found that electrolytic manganese dioxide having an alkali potential of at least 310 mV, a full width at half maximum (hereinafter referred to as FWHM) of the (110) diffraction line appearing in the vicinity of $2\theta=22\pm1°$ in XRD measurement using CuKα radiation being at least 2.2° and at most 3.0°, and a (110)/(021) peak intensity ratio in the X-ray diffraction of at least 0.50 and at most 0.80, becomes a cathode material excellent particularly in the high rate discharge characteristic, and the present invention has been accomplished on the basis of this discovery.

Now, the present invention will be described in further detail.

The electrolytic manganese dioxide of the present invention is manganese dioxide, of which the alkali potential is at least 310 mV, the full width at half maximum (FWHM) of the (110) diffraction line in the vicinity of $2\theta=22\pm1°$ is at least 2.2° and at most 3.0°, and the (110)/(021) peak intensity ratio of the X-ray diffraction is at least 0.50 and at most 0.80.

The manganese dioxide of the present invention is preferably such that the full width at half maximum (FWHM) of the (110) plane in the X-ray diffraction (CuKα line as light source) is at least 2.2° and at most 3.0°, further preferably at least 2.2° and at most 2.9°.

When the alkali potential is at least 310 mV, in a case where such a material is used as a cathode material for an alkali-manganese dry cell, the open circuit voltage of the cell will be increased, and it is possible to prolong the discharge time until the lower limit of the useful discharge voltage. The alkali potential is preferably at least 330 mV, further preferably at least 340 mV.

Of the electrolytic manganese dioxide of the present invention, the full width at half maximum (FWHM) of the (110) diffraction line in the vicinity of $2\theta=22\pm1°$ in the pattern obtained by usual XRD measurement using CuKα radiation, is at least 2.2° and at most 3.0°, preferably at least 2.4° and at most 2.9°, further preferably at least 2.5° and at most 2.8°. With such FWHM, the packing efficiency will be improved, and the discharge capacity will be increased.

On the other hand, with one having a FWHM larger than 3.0°, when a cell is constructed by using it as a cathode material, the packing density tends to be low, and the discharge capacity tends to be low accordingly. With one having a FWHM smaller than 2.2°, crystallite growth tends to be too much, whereby the reactivity of electrolytic manganese dioxide tends to be poor, and the discharge capacity as a cathode active material for a cell tends to decrease.

The reason for the lower limit of FWHM being as small as 2.2° is such that the electrolytic manganese dioxide of the present invention is obtained, for example, by the after-mentioned electrolysis in an electrolyte containing sulfuric acid at a low concentration and the subsequent electrolysis using an electrolyte containing sulfuric acid at a high concentration, and accordingly, in a case where the ratio of the time for electrolysis in the electrolyte containing sulfuric acid at a low concentration is large, it will be manganese dioxide having a small FWHM and a high alkali potential.

The crystallite diameter of the electrolytic manganese dioxide of the present invention is obtained by the Scherrer's formula from FWHM and the (110) peak position, and the average crystallite diameter corresponds to from about 27 to 37 Å. With electrolytic manganese dioxide having an average crystallite diameter larger than 37 Å, the reactivity tends to decrease, and the discharge capacity tends to be low, as mentioned above, and with one having an average crystallite diameter smaller than 27 Å, the packing efficiency tends to be poor, and the volume energy density tends to be low.

Further, the electrolytic manganese dioxide of the present invention is such that the (110)/(021) peak intensity ratio in the X-ray diffraction is at least 0.50 and at most 0.8°, preferably at least 0.53 and at most 0.80.

The intensity ratios of the respective diffraction planes in the X-ray diffraction pattern of the electrolytic manganese dioxide varies depending upon the conditions for the electrolysis and the physical properties of manganese dioxide consequently obtained. With manganese dioxide obtained by electrolyzing only in the electrolyte containing a high sulfuric acid concentration, the above-described characteristics is satisfied, but the (110)/(021) peak intensity ratio becomes less than 0.50. On the other hand, with a product having a high alkali potential obtained by electrolysis at a low current density, such a peak intensity ratio exceeds 0.8, such being different from the manganese dioxide of the present invention.

The (110) plane in the X-ray diffraction of the electrolytic manganese dioxide corresponds to the main X-ray diffraction peak of the manganese dioxide crystal appearing in the vicinity of $22\pm1°$ as mentioned above, and the (021) plane corresponds to the main peak appearing in the vicinity of $37\pm1°$.

The manganese dioxide of the present invention is preferably has an alkali potential of at least 350 mV and at most 400 mV, a molar ratio of structural water contained ($H_2O/MnO_2$) being at least 0.20, and a (110)/(021) peak intensity ratio in the X-ray diffraction (CuKα line as light source) being at least 0.50 and at most 0.80.

When the alkali potential is at least 350 mV, in a case where it is used as a cathode material for an alkali-manganese dry cell, the open circuit voltage of the cell increases, and it is possible to prolong the discharge time until the lower limit of the useful discharge voltage. However, if the alkali potential exceeds 400 mV, the stability tends to deteriorate.

The amount of structural water in the manganese dioxide having an alkali potential of at least 350 mV of the present invention is larger than 0.20 by molar ratio to manganese. When the alkali potential is at least 350 mV, if the amount of structural water is at most 0.20, a sufficient high rate discharge characteristic can not be obtained.

The structural water in the present invention means one quantified by the amount of $H_2O$ desorbed at a temperature of from 110° C. to 320° C. in the thermogravimetric analysis. By setting the temperature range in the thermogravimetric analysis to be at least 110° C., physically adsorbed $H_2O$ (adhesive moisture) desorbed at a lower temperature is excluded, and by setting the upper limit to be 320° C., the structural water is distinguished also from $O_2$ released by reduction of $MnO_2$.

There is no particular restriction as to the upper limit for the molar ratio of structural water. However, a sufficient high rate discharge characteristic can be obtained when the molar ratio is more than 0.20 and up to 0.22.

The manganese dioxide of the present invention is preferably such that the (221)/(021) peak intensity ratio in the X-ray diffraction (CuKα radiation) is at least 0.65, more preferably more than 0.70. It is further preferably at least 0.9. There is no particular restriction as to the upper limit for the (221)/(021) peak intensity ratio, but a high rate discharge characteristic can be obtained when it exceeds 1.0 and up to 1.2.

The electrolytic manganese dioxide of the present invention is preferably such that the (110) interplanar spacing in the X-ray diffraction is preferably at least 4.00 Å and at most 4.06 Å with satisfying the above-described characteristics.

Here, the (110) interplanar spacing is an index to represent a distance between (110) crystal planes of manganese dioxide belonging to orthorhombic crystal.

In conventional manganese dioxide having an alkali potential higher than 310 mV, the (110) interplanar spacing is larger than 4.06 Å. In the electrolytic manganese dioxide of the present invention, the (110) interplanar spacing is small, whereby the stability of crystal is good.

The electrolytic manganese dioxide of the present invention is particularly preferably such that the BET specific surface area is at least 22 $m^2/g$ and at most 32 $m^2/g$.

If the BET specific surface area is smaller than 22 $m^2/g$, the reactivity of the electrolytic manganese dioxide tends to be poor, and the discharge capacity tends to be low as a cathode active material for cells, and if the BET specific surface area is larger than 32 $m^2/g$, the packing efficiency of the electrolytic manganese dioxide tends to be poor, and the discharge capacity when a cell is constructed, tends to be low.

The electrolytic manganese dioxide of the present invention has characteristics in e.g. the alkali potential, the FWHM of the (110) plane, the (110) interplanar spacing, and the (110)/(021) peak intensity ratio and thus is different and can readily be distinguished from one having only the alkali potential or the packing efficiency adjusted by mixing conventional electrolytic manganese dioxides obtained under different conditions.

Now, the method for producing electrolytic manganese dioxide of the present invention will be described.

A conventional method for producing electrolytic manganese dioxide is carried out usually so that the sulfuric acid concentration in the electrolyte be maintained to be constant during the electrolysis. Whereas the method of the present invention is characterized in that the sulfuric acid concentration in the electrolyte is changed during the electrolysis and thus is entirely different from the conventional method. Now, the method of the present invention will be described in detail.

In the present invention, in the initial stage of the process, the electrolysis is carried out while the sulfuric acid concentration is maintained to be constant at a low level, and then, from the middle of the process, electrolysis is carried out under such a condition that the sulfuric acid concentration is adjusted to be high, whereby it is possible to obtain manganese dioxide having a high alkali potential and having characteristics in crystallinity, and it is possible to produce high quality manganese dioxide constantly, which is without exfoliation of manganese dioxide deposit from the electrode during the electrolysis.

In the production of manganese dioxide by electrolysis, if the sulfuric acid concentration in the electrolyte is set to be low, electrolytic manganese dioxide will be electrodeposited firmly on the anode, whereby there is no problem of exfoliation, but it is thereby possible to obtain only electrolytic manganese dioxide having a low alkali potential.

On the other hand, in electrolysis at a high sulfuric acid concentration, manganese dioxide having a high alkali potential may be obtained, but exfoliation occurs during electrodeposition, and it is not possible to constantly obtain manganese dioxide having a high potential, and the crystallite tends to be small, and it is possible to obtain only a product having a high BET surface area and low packing efficiency.

The present invention is based on a discovery that in the initial stage, it is possible to obtain manganese dioxide having a large crystallite diameter, a low BET surface area and high packing efficiency by the electrolysis at a low sulfuric acid concentration, and further by the subsequent electrolysis at a high sulfuric acid concentration, the alkali potential can be improved including the manganese dioxide obtained by the electrolysis in the initial stage.

The sulfuric acid concentration in the electrolyte in the method of the present invention is preferably adjusted to be from 25 to 40 g/L at the initiation of the electrolysis and in the later stage, the sulfuric acid concentration is increased, so that at the termination of the electrolysis, it is higher than 40 g/L and up to 75 g/L Further, it is particular preferred to adjust the sulfuric acid concentration in the electrolyte at the is initiation of the electrolysis to be from 29 to 40 g/L, and in the later stage, the sulfuric acid concentration is increased so that at the termination of the electrolysis, it is from 44 to 75 g/L. Here, the sulfuric acid concentration excludes bivalent anions of manganese sulfate.

With respect to the manganese concentration in the electrolyte feed solution of the present invention, there is no particular limitation, but it may, for example, be from 40 to 60 g/L.

The temperature for the electrolysis is not particularly limited, and it may, for example, be a temperature within a range of from 94 to 98° C. Further, the current density may, for example, be from 0.4 to 0.6 $A/dm^2$. The ratio of the electrolysis in the initial stage to the electrolysis in the later stage is not particularly limited, but the ratio in the electrolysis time at the lower sulfuric acid concentration to at the high sulfuric acid concentration may, for example, be preferably within a range of from 1:9 to 9:1, particularly, preferable range is from 3:7 to 7:3.

Manganese dioxide having an alkali potential of at least 350 mV can be prepared in such a manner that electrolytic manganese dioxide electrodeposited in a manganese sulfate bath wherein the concentration of sulfuric acid in the electrolyte at the termination of the electrolysis is higher than the concentration of sulfuric acid in the electrolyte at the initiation of the electrolysis, is further treated with at least 2 mol/L and at most 15 mol/L of sulfuric acid.

In a case where the sulfuric acid concentration in the electrolyte at the termination of the electrolysis is higher than the sulfuric acid concentration in the electrolyte at the initiation of the electrolysis, the electrolytic manganese dioxide thereby obtained will have an alkali potential higher than electrolytic manganese dioxide prepared by an electrolytic method where the sulfuric acid concentration is constant at a low level, but it is thereby still difficult to obtain an alkali potential of at least 350 mV. Further, if electrolytic manganese dioxide prepared by a conventional electrolytic method is subjected to sulfuric acid treatment, it is impossible to obtain electrolytic manganese dioxide which satisfies the characteristics of the present invention, since the properties of electrolytic manganese dioxide as the raw material are inadequate.

The electrolytic manganese dioxide of the present invention is useful particularly as a cathode active material for an alkali-manganese dry cell.

The method of using it as a cathode active material for an alkali-manganese cell is not particularly limited, and it may be used mixing with additives by a well known method.

For example, in order to impart electrical is conductivity, carbon or the like may be added to the electrolytic manganese dioxide to prepare a powder mixture, which is compression-molded into a disk or ring shape to obtain a powder molded product which is useful as a cathode for a cell. The cathode active material for a cell of the present invention preferably contains at least 0.1 wt % of nickel oxyhydroxide in the electrolytic manganese dioxide. By nickel oxyhydroxide thus contained, the stability of the electrolytic manganese dioxide will be improved, and in an aqueous potassium hydroxide solution as the electrolyte of an alkali dry cell, the stability of the electrolytic manganese dioxide will be improved. Here, the amount of nickel oxyhydroxide to be added, is preferably at most 10 wt % from the viewpoint of economical efficiency and not to impair the cell characteristics of the electrolytic manganese dioxide.

The electrolytic manganese dioxide of the present invention is uniform and has such a high electric potential in an alkaline electrolyte that has not been attained heretofore.

In particular, a discharge life longer by at least 10% than a case where conventional electrolytic manganese dioxide is used, is obtainable in a usual evaluation of the high rate discharge characteristic, which is designed to evaluate the characteristic by the discharge time until the voltage reaches a cut-off voltage of 0.9 V by using, as one pulse, a cycle wherein an alkali-manganese dry cell employing the electrolytic manganese dioxide of the present invention as the cathode active material, is discharged at 1,000 mA for ten seconds, followed by pausing for 50 seconds.

Further, an AA battery type alkali-manganese dry cell using the electrolytic manganese dioxide of the present invention as the cathode active material, is continuously discharged under a load of 1 watt, and the discharge capacity of the cell is calculated from the amount of discharge current until the voltage reaches the cut-off voltage of 0.9 V, whereby it is possible to obtain a high discharge capacity of at least 70 mAh/g, particularly at least 72 mAh/g, further at least 76 mAh/g, as a capacity calculated per unit weight of the electrolytic manganese dioxide.

DETAILED DESCRIPTION OF THE PRESENT INVENTION

Figure 1:
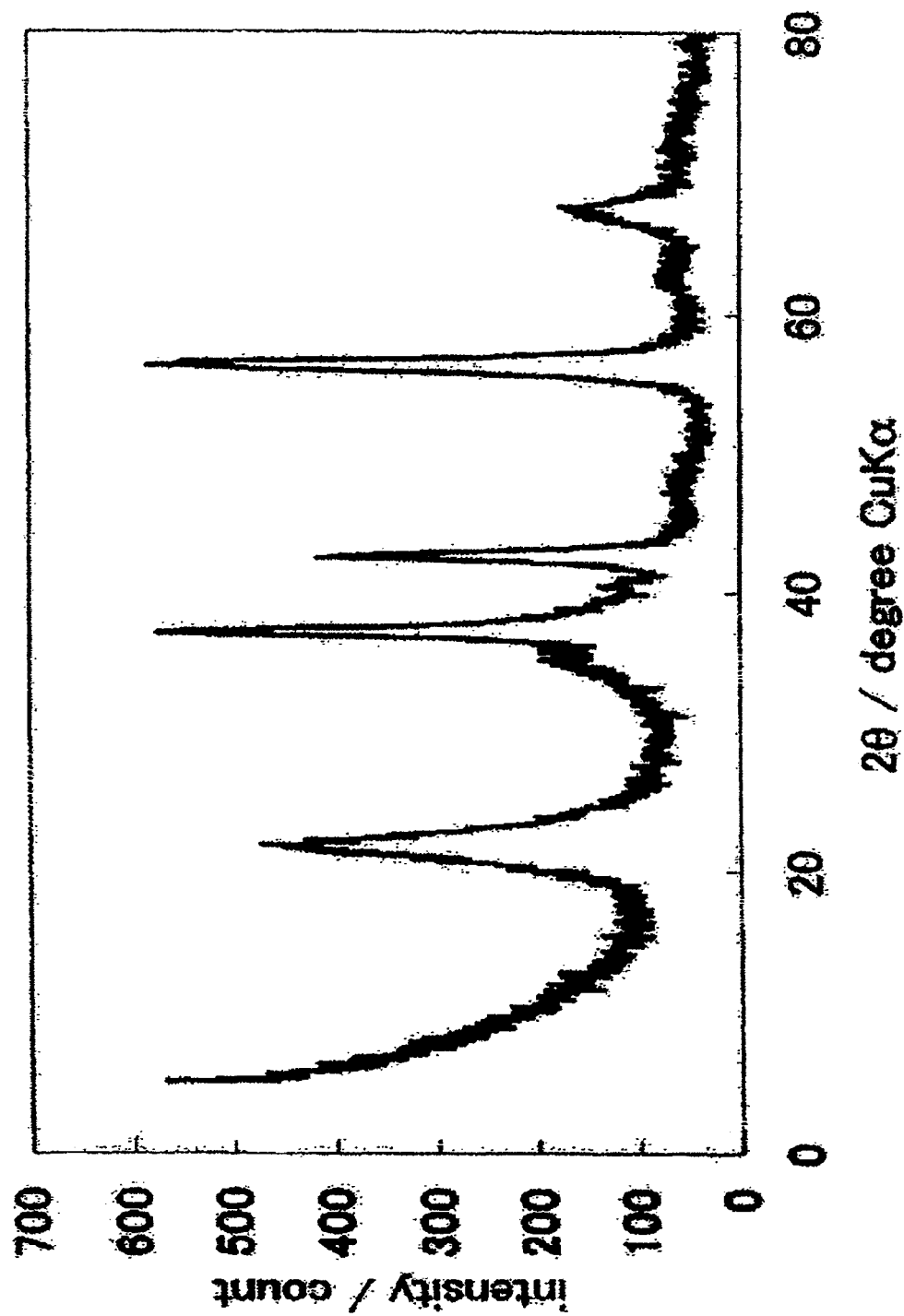
FIG. 1 shows an XRD pattern of the electrolytic manganese dioxide of the present invention. (Example 5)
Figure 2:
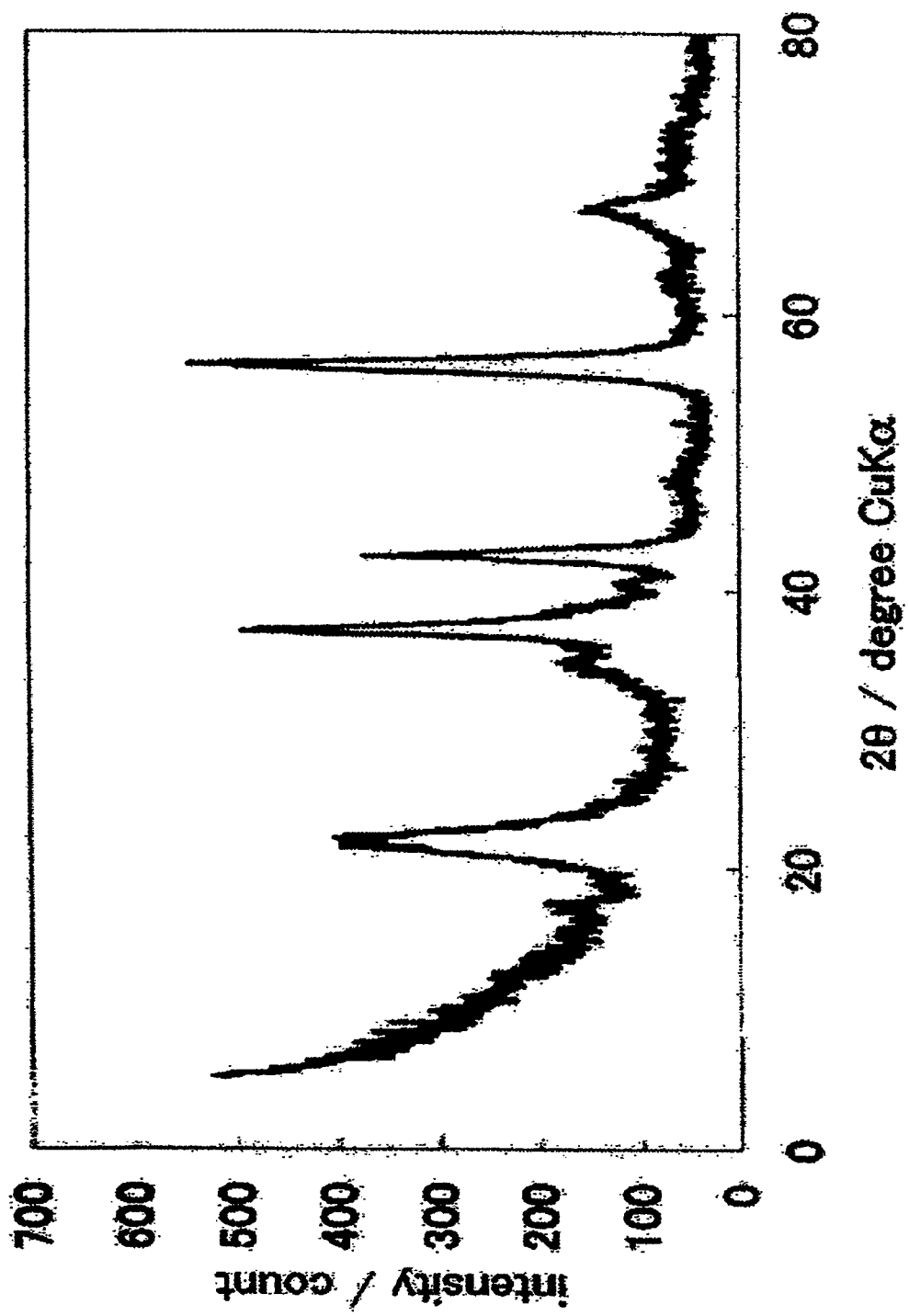
FIG. 2 shows an XRD pattern of electrolytic manganese dioxide obtained by electrolysis under a conventional low sulfuric acid concentration condition. (Comparative Example 1)
Figure 3:
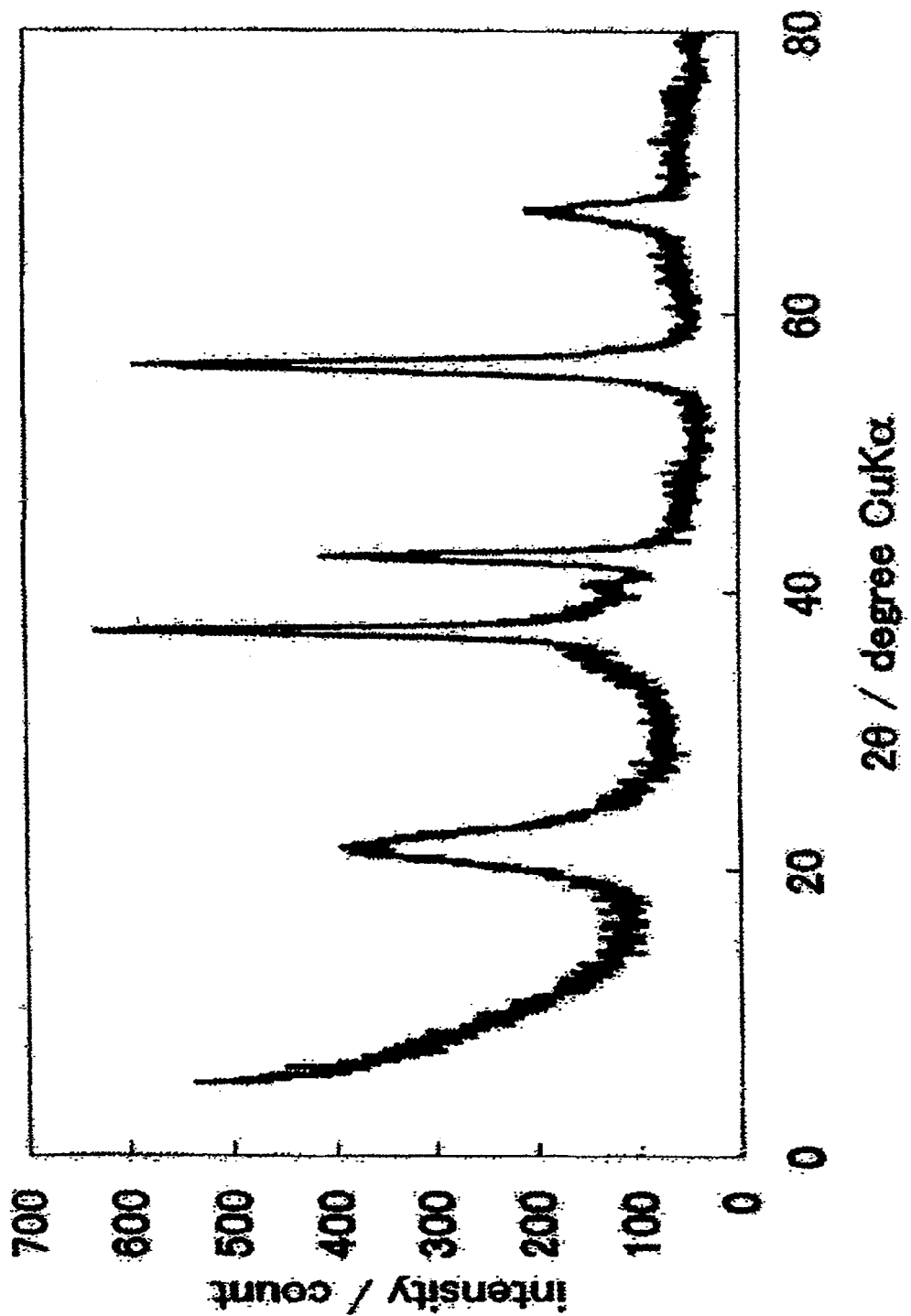
FIG. 3 shows an XRD pattern of electrolytic manganese dioxide obtained by electrolysis under a conventional high sulfuric acid concentration condition. (Comparative Example 3)
Figure 4:
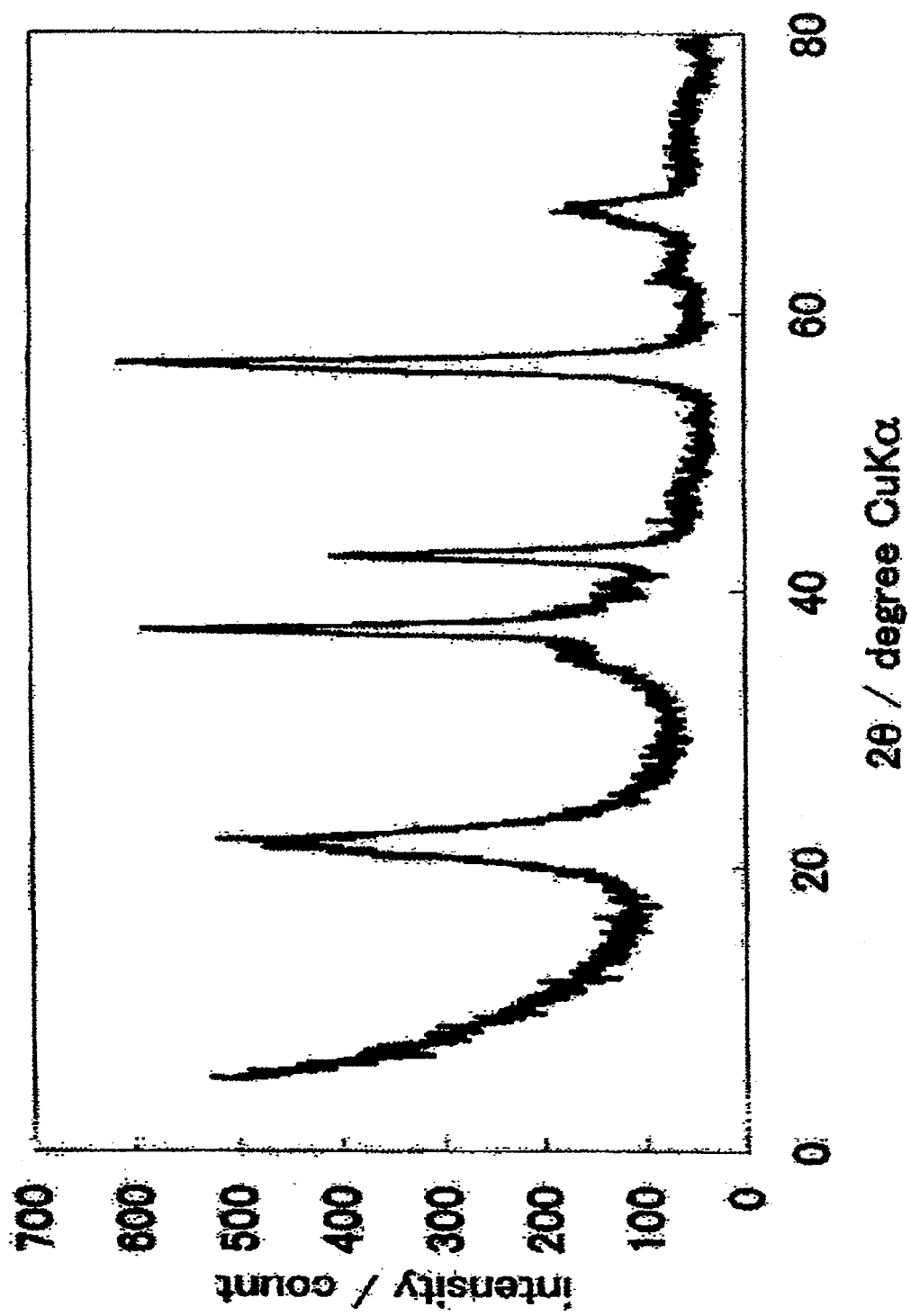
FIG. 4 shows an XRD pattern of electrolytic is manganese dioxide obtained by electrolysis at a conventional low current density. (Comparative Example 4)

Now, the present invention will be described in detail with reference to Examples and Comparative Examples, but it should be understood that the present invention is by no means restricted to such Examples.

Measurement of Electric Potential of Electrolytic Manganese Dioxide

The electric potential of electrolytic manganese dioxide was measured in a 40% KOH aqueous solution as follows.

To 3 g of electrolytic manganese dioxide, 0.9 g of carbon was added as a conductive agent to obtain a powder mixture, and 4 mL of a 40% KOH aqueous solution was added to this powder mixture to obtain a mixture slurry comprising the electrolytic manganese dioxide, the carbon and the KOH aqueous solution. The electric potential of this mixture slurry was measured by using a mercury/mercury oxide reference electrode as a standard to obtain an alkali potential of the electrolytic manganese dioxide.

Measurement of Full Width at Half Maximum (FWHM) in XRD Measurement

The full width at half maximum (FWHM) of the diffraction line in the vicinity of $2\theta=22\pm1°$ of electrolytic manganese dioxide was measured by using a usual X-ray diffraction apparatus (MXP-3, manufactured by MAC Science Co., Ltd.). The measurement was carried out by using CuKα line ($\lambda=1.5405$ Å) as the radiation source; the measurement mode was step scanning; the scanning condition was 0.04° per second; measuring time was 3 seconds; and the measuring range was within a range of 2θ being from 5 to 80°.

Calculation of (110) Interplanar Spacing by XRD Measurement

The diffraction line in the vicinity of $2\theta=22\pm1°$ of electrolytic manganese dioxide was subjected to Gaussian treatment to obtain 2θ at the peak top. From the obtained 2θ value, d was calculated by Bragg's equation ($n\lambda=2d\sin\theta$, $n=1$) and taken as the (110) interplanar spacing.

Calculation of (110)/(021) and (221)/(021) Intensity Ratios by XRD Measurement

Assuming that the diffraction line in the vicinity of $2\theta=22\pm1°$ represents (110), the diffraction line in the vicinity of $37\pm1°$ represents (021), and the diffraction line in the vicinity of $56\pm1°$ represents (221), the (110)/(021) peak intensity ratio was obtained by dividing the (110) peak intensity by the (021) peak intensity, and the (221)/(021) peak intensity ratio was obtained by dividing the (221) peak intensity by the (021) peak intensity.

Measurement of Bet Specific Surface Area of Electrolytic Manganese Dioxide

The BET specific surface area of electrolytic manganese dioxide was measured by nitrogen adsorption by BET one point method. Here, electrolytic manganese dioxide used for the measurement of the BET specific surface area was subjected to deaeration treatment by heating it at 150° C. for 40 minutes before the measurement of the BET specific surface area.

Measurement of Amount of Structural Water

The amount of structural water of electrolytic manganese dioxide was measured by a thermogravimetric analyzer (TG/DTA6300, manufactured by Seiko Instruments Inc.).

In the thermogravimetric analyzer, electrolytic manganese dioxide was heated to 110° C. and maintained for 16 hours in a nitrogen stream to remove adsorbed water. Then, it was heated to 240° C. and maintained for 12 hours and further heated to 320° C. and maintained for 12 hours, whereby the weight reduction from 110° C. to 320° C. was taken as the content of structural water.

The temperature raising rate in the measurement was 10° C./min. The desorbed substance from 240° C. to 320° C. was confirmed to be $H_2O$ by the mass analysis of the desorbed substance. Further, the amount of manganese contained in a sample was obtained by potentiometric titration by subjecting the sample to dissolution treatment. Thus, the molar ratio of structural water to manganese in the electrolytic manganese dioxide was obtained.

Evaluation of High Rate Discharge Characteristic at 1,000 mA Pulse in AA Battery 5 g of a powder mixture comprising 85.8% of electrolytic manganese dioxide, 7.3% of graphite (KS-44, manufactured by Lonza) and 6.9% of a 40% potassium hydroxide electrolyte, was molded into a ring shape under a molding pressure of 2 tons to obtain a molded product. Two such molded products were combined to be a cathode, and using an anode material containing zinc, as an anode, an electric cell of LR6 type battery (AA battery) as defined in JIS C8511 was assembled. Such an AA battery-type cell was left to stand at room temperature for 24 hours and then subjected to a discharge test. The discharge conditions were such that a cycle of discharging at 1,000 mA for 10 seconds, followed by pausing for 50 seconds was regarded as one pulse, and a relative discharge time until the voltage reached a cut-off voltage of 0.9 V was taken. Here, the standard for the relative discharge time was such that the discharge time in an optionally selected Comparative Example was taken as 100%.

Evaluation of OCV in AA Battery and Cell Characteristic at 1 Watt

The above-mentioned LR6 type battery (AA battery) was left to stand at room temperature for 72 hours and then the open circuit voltage (OCV) was measured by a volt meter. Then, the AA battery type cell was connected to a discharge test apparatus (BTS2305 manufactured by Nagano), and a discharge test was carried out under a load of 1 watt. The cell characteristic was evaluated by determining a discharge capacity (mAh) per cell from an integrated quantity of the discharge current until the voltage reached a cut-off voltage of 0.9 V, and converting it to a discharge capacity per weight (mAh/g) of the electrolytic manganese dioxide in the cell. Here, the OCV measurement and the cell characteristic at 1 watt were evaluated by preparing five cells for each electrolytic manganese dioxide sample, and an average value of the five cells were taken as the evaluated value of each electrolytic manganese dioxide.

EXAMPLE 1

Electrolysis was carried out for 16 days at a current density of 0.5 A/dm$^2$ at an electrolysis temperature of 96° C. by using a manganese sulfate solution having a manganese concentration of 50.0 g/L as an electrolyte feed solution and adjusting the sulfuric acid concentration in the initial stage and the later stage of the electrolysis to be 29.2 g/L and 74.8 g/L, respectively. The electrolysis was carried out for 13 days at the concentration of the initial stage and for 3 days at the concentration of the later stage.

EXAMPLE 2

Electrolysis was carried out for 14 days at a current density of 0.5 A/dm$^2$ at an electrolysis temperature of 96° C. by using a manganese sulfate solution having a manganese concentration of 40.0 g/L as an electrolyte feed solution and adjusting the sulfuric acid concentration in the initial stage and the later stage of the electrolysis to be 29.2 g/L and 49.2 g/L, respectively. The electrolysis was carried out for 10 days at the concentration of the initial stage and for 4 days at the concentration of the later stage.

EXAMPLE 3

Electrolytic manganese dioxide was obtained in the same manner as in example 2 except that the sulfuric acid concentration in the electrolyte for 12 days in the initial stage of the electrolysis was 29.2 g/L, and the sulfuric acid concentration in the electrolyte for 2 days in the later stage of the electrolysis was 44.7 g/L.

EXAMPLE 4

Electrolytic manganese dioxide was obtained in the same manner as in example 2 except that the sulfuric acid concentration in the electrolyte for 4 days in the later stage of the electrolysis was changed to 59.0 g/L.

EXAMPLE 5

Electrolytic manganese dioxide was obtained in the same manner as in example 2 except that a manganese sulfate solution having a manganese concentration of 45.0 g/L was used as the electrolyte feed solution, the sulfuric concentration for 10 days in the initial stage of the electrolysis was changed to 32.9 g/L, and the sulfuric acid concentration in the later stage of the electrolysis was changed to 48.8 g/L.

EXAMPLE 6

Electrolytic manganese dioxide was obtained in the same manner as in example 5 except that the sulfuric acid concentration in the electrolyte for 4 days in the later stage of the electrolysis was changed to 66.7 g/L.

EXAMPLES 7 AND 8

A block product obtained by the electrolysis under the same conditions as in Example 1 was cut out. Namely, electrolytic manganese dioxides electrodeposited in the vicinity of the anode and on the electrolyte side were cut out. Each portion had an alkali potential of at least 310 mV and a uniform alkali potential. From the results, the electrolytic manganese dioxide of the present invention was confirmed to be electrolytic manganese dioxide having a uniform high alkali potential as a whole i.e. not a mixture of conventional electrolytic manganese dioxide having a low potential electrolyzed at a low sulfuric acid concentration and conventional electrolytic manganese dioxide having a high potential electrolyzed at a high sulfuric acid concentration.

EXAMPLE 9

Electrolysis was carried out for 17 days at a current density of 0.5 A/dm$^2$ at an electrolysis temperature of 96° C. by using a manganese sulfate solution having a manganese concentration of 42.0 g/L as an electrolyte feed solution and adjusting the sulfuric acid concentration in the initial stage and the later stage of the electrolysis to be 40.0 g/L and 70.0 g/L, respectively. The electrolysis was carried out for 12 days at the concentration of the initial stage and for 5 days at the concentration of the later stage.

EXAMPLE 10

Electrolytic manganese dioxide was obtained in the same manner as in Example 9 except that the electrolysis was carried out for 15 days so that the sulfuric acid concentration in the later stage of the electrolysis became 72.0 g/L, and the electrolysis was carried out for 9 days at the concentration of the initial stage and for 6 days at the concentration of the later stage.

EXAMPLE 11

Electrolysis was carried out for 17 days at a current density of 0.5 A/dm$^2$ at an electrolysis temperature of 96° C. by using a manganese sulfate solution having a manganese concentration of 40.0 g/L as an electrolyte feed solution and adjusting the sulfuric acid concentration in the initial stage and the later stage of the electrolysis to be 33.0 g/L and 65.0 g/L, respectively. The electrolysis was carried out for 12 days at the concentration of the initial stage and for 5 days at the concentration of the later stage.

EXAMPLE 12

Electrolysis was carried out for a total of 16 days at a current density of 0.5 A/dm$^2$ at an electrolysis temperature of 96° C. by using a manganese sulfate solution having a manganese concentration of 50.0 g/L as an electrolyte feed solution and adjusting the sulfuric acid concentration in the initial stage and the later stage of the electrolysis to be 29.2 g/L and 74.8 g/L, respectively, for 13 days at the concentration of the initial stage and for 3 days at the concentration of the later stage. 100 g of the electrolytic manganese dioxide thus obtained was immersed in 200 mL of a 5 mol/L sulfuric acid aqueous solution and stirred for 4 hours at 25° C., followed by filtration, washing with water and drying to obtain manganese dioxide.

EXAMPLE 13

The preparation was carried out under the same condition as in Example 12 except that sulfuric acid treatment was carried out with a 10 mol/L sulfuric acid aqueous solution.

EXAMPLE 14

Electrolysis was carried out for a total of 17 days at a current density of 0-5 A/dm$^2$ at an electrolysis temperature of 96° C. by using a manganese sulfate solution having a manganese concentration of 40.0 g/L as an electrolyte feed solution and adjusting the sulfuric acid concentration in the initial stage and the later stage of is the electrolysis to be 33.0 g/L and 65.0 g/L, respectively, for 12 days at the concentration of the initial stage and for 5 days at the concentration of the later stage.

100 g of the electrolytic manganese dioxide thereby obtained was immersed in 200 mL of a 7 mol/L sulfuric acid aqueous solution and stirred for 4 hours at 25° C., followed by filtration, washing with water and drying to obtain manganese dioxide.

EXAMPLE 15

The preparation was carried out under the same conditions as in Example 12 except that sulfuric acid treatment was carried out with a 1 mol/L sulfuric acid aqueous solution.

The alkali potential was at least 310 mV but did not reach 350 mV.

COMPARATIVE EXAMPLE 1

Electrolytic manganese dioxide was obtained under a constant condition at a current density of 0.5 A/dm$^2$ at an electrolysis temperature of 96° C. at a manganese concentration in the electrolyte feed solution of 40.0 g/L by adjusting the sulfuric acid concentration in the electrolyte to be 32.9 g/L throughout the entire period of the electrolysis.

The manganese dioxide obtained by the electrolysis at a constant low sulfuric acid concentration had a large crystallite diameter and a low alkali potential.

COMPARATIVE EXAMPLE 2

Electrolytic manganese dioxide was obtained in the same manner as in Example 2 except that the sulfuric concentration in the electrolyte was made high and constant at 48.5 g/L over the entire period of the electrolysis. Exfoliation of the electrodeposited electrolytic manganese dioxide occurred.

Although the alkali potential was high, the crystallite diameter calculated from FWHM was smaller than 30 Å, and the packing efficiency was low. The BET specific surface area was larger than 32 m$^2$/g, and the packing efficiency was low.

COMPARATIVE EXAMPLE 3

Electrolytic manganese dioxide was obtained in the same manner as in Comparative Example 2 except that a carbon plate was used as the anode.

The crystallite diameter calculated from FWHM was smaller than 30 Å, and the packing efficiency was low.

COMPARATIVE EXAMPLE 4

Electrolytic manganese dioxide was obtained in the same manner as in Comparative Example 2 except that the current density was changed to 0.3 A/dm$^2$. Opposite to Comparative Example 2, the BET specific area was smaller than 22 m$^2$/g, and the reactivity was low.

COMPARATIVE EXAMPLE 5

Electrolytic manganese dioxide was obtained in the same manner as in Example 2 except that the current density was changed to 0.3 A/dm$^2$, and the sulfuric acid concentration in the electrolyte was adjusted to be constant at 53.7 g/L over the entire period of the electrolysis.

An AA battery was assembled, and evaluation of the high rate discharge characteristic was carried out at a 1,000 mA pulse. As a result, the relative discharge rate was 104%, based on the discharge time in Comparative Example 1 being 100%, and thus, improvement in the discharge characteristic was small.

COMPARATIVE EXAMPLE 6

Electrolysis was carried out for 17 days at a current density of 0.5 A/dm$^2$ at an electrolysis temperature of 96° C. by using a manganese sulfate solution having a manganese concentration of 40.0 g/L as an electrolyte feed-solution and adjusting the sulfuric acid concentration to be 39.0 g/L.

COMPARATIVE EXAMPLE 7

100 g of the electrolytic manganese dioxide obtained in Comparative Example 6 was immersed in 200 mL of a 10 mol/L sulfuric acid aqueous solution and stirred for 4 hours at 25° C., followed by filtration, washing with water and drying. One having a high alkali potential was obtained, but the crystallinity of manganese dioxide was different, and improvement in the high rate discharge characteristic was not sufficient.

COMPARATIVE EXAMPLE 8

Electrolysis was carried out for 15 days at a current density of 0.6 A/dm$^2$ at an electrolysis temperature of 98° C. at a manganese concentration of manganese sulfate of 50.0 g/L at a sulfuric acid concentration of 32.0 g/L.

COMPARATIVE EXAMPLE 9

100 g of the electrolytic manganese dioxide powder obtained in Comparative Example 8 was immersed in 200 mL of a 10 mol/L sulfuric acid aqueous solution and stirred for 4 hours at 25° C., followed by filtration, washing with water and drying. One having a high alkali potential was obtained, but the crystallinity of manganese dioxide was different, and improvement in the high rate discharge characteristic was not sufficient.

Evaluation of Stability of Cathode Material

To the electrolytic manganese dioxide in Example 12, 0 wt %, 1 wt % or 5 wt % of nickel oxyhydroxide was added. 85.8% of such a powder, 7.3% of graphite and 6.9% of a 40% potassium hydroxide electrolyte were mixed to obtain a cathode material powder. 6 g of this cathode material powder was put into 20 mL of a 40% potassium hydroxide electrolyte, and the mixture was stored at 60° C. for 3 days, whereupon the amount of Mn eluted in the electrolyte was measured.

The results are shown in Table 2.

TABLE 1

| | Preparation conditions | | | | | | |
|---|---|---|---|---|---|---|---|
| | Manganese concentration in electrolyte feed solution (g/L) | Sulfuric acid concentration in electrolyte (g/L) | | Current density (A/dm$^2$) | Number of days for electrolysis (day) | | Sulfuric acid treatment (mol/L) |
| | | Initial | Terminal | | After change | Total days | |
| Ex. 1 | 50.0 | 29.2 | 74.8 | 0.5 | 3 | 16 | — |
| Ex. 2 | 40.0 | 29.2 | 49.2 | 0.5 | 4 | 14 | — |
| Ex. 3 | 40.0 | 29.2 | 44.7 | 0.5 | 2 | 14 | — |
| Ex. 4 | 40.0 | 29.2 | 59.0 | 0.5 | 4 | 14 | — |
| Ex. 5 | 45.0 | 32.9 | 48.8 | 0.5 | 4 | 14 | — |
| Ex. 6 | 45.0 | 32.9 | 66.7 | 0.5 | 4 | 14 | — |
| Ex. 7 | 50.0 | 29.2 | 74.8 | 0.5 | 3 | 16 | — |
| Ex. 8 | 50.0 | 29.2 | 74.8 | 0.5 | 3 | 16 | — |
| Ex. 9 | 42.0 | 40.0 | 70.0 | 0.5 | 5 | 17 | — |
| Ex. 10 | 42.0 | 40.0 | 72.0 | 0.5 | 6 | 15 | — |
| Ex. 11 | 40.0 | 33.0 | 65.0 | 0.5 | 5 | 17 | — |
| Ex. 12 | 50.0 | 29.2 | 74.8 | 0.5 | 3 | 16 | 5 |
| Ex. 13 | 50.0 | 29.2 | 74.8 | 0.5 | 3 | 16 | 10 |
| Ex. 14 | 40.0 | 33.0 | 65.0 | 0.5 | 5 | 17 | 7 |
| Ex. 15 | 50.0 | 29.2 | 74.8 | 0.5 | 3 | 16 | 1 |
| Comp. Ex. 1 | 40.0 | 32.9 | | 0.5 | 0 | 14 | — |
| Comp. Ex. 2 | 40.0 | 48.5 | | 0.5 | 0 | 14 | — |
| Comp. Ex. 3 | 40.0 | 48.5 | | 0.5 | 0 | 14 | — |
| Comp. Ex. 4 | 40.0 | 48.5 | | 0.3 | 0 | 14 | — |
| Comp. Ex. 5 | 40.0 | 53.7 | | 0.3 | 0 | 14 | — |
| Comp. Ex. 6 | 40.0 | 39.0 | | 0.5 | 0 | 17 | — |
| Comp. Ex. 7 | 40.0 | 39.0 | | 0.5 | 0 | 17 | 10 |
| Comp. Ex. 8 | 50.0 | 32.0 | | 0.6 | 0 | 15 | — |
| Comp. Ex. 9 | 50.0 | 32.0 | | 0.6 | 0 | 15 | 10 |

| | Results | | | | | | |
|---|---|---|---|---|---|---|---|
| | Alkali potential (mV) | BET specific surface area (m$^2$/g) | FWHM (deg.) | Crystallite diameter (Å) | Structural water (H$_2$O/Mn) | (110) spacing (Å) | (110)/ (021) |
| Ex. 1 | 320 | 29.8 | 2.9 | 29.9 | 0.184 | 4.03 | 0.60 |
| Ex. 2 | 343 | 26.3 | 2.6 | 32.9 | — | 4.05 | 0.68 |
| Ex. 3 | 331 | 28.4 | 2.6 | 32.9 | — | 4.05 | 0.74 |
| Ex. 4 | 341 | 30.4 | 2.7 | 31.7 | — | 4.06 | 0.65 |
| Ex. 5 | 325 | 31.4 | 2.5 | 34.3 | — | 4.04 | 0.66 |
| Ex. 6 | 330 | 30.3 | 2.6 | 33.0 | — | 4.04 | 0.53 |
| Ex. 7 | 312 | 25.2 | 2.4 | 36.2 | — | 4.01 | 0.68 |
| Ex. 8 | 315 | 25.2 | 2.7 | 32.3 | — | 4.05 | 0.69 |
| Ex. 9 | 319 | 28.0 | 2.4 | 35.7 | — | 4.03 | 0.78 |
| Ex. 10 | 313 | 26.0 | 2.2 | 38.9 | — | 4.04 | 0.80 |
| Ex. 11 | 317 | 24.0 | 2.88 | 27.6 | 0.193 | 4.04 | 0.73 |

TABLE 1-continued

|  |  |  |  |  |  |  |  |
|---|---|---|---|---|---|---|---|
| Ex. 12 | 371 | 27.0 | 2.72 | 29.2 | 0.202 | 4.03 | 0.74 |
| Ex. 13 | 395 | 27.0 | 2.82 | 28.2 | 0.203 | 4.01 | 0.76 |
| Ex. 14 | 367 | 24.0 | 2.98 | 26.9 | 0.202 | 4.03 | 0.68 |
| Ex. 15 | 332 | 28.0 | 2.68 | 29.7 | 0.197 | 4.02 | 0.75 |
| Comp. Ex. 1 | 274 | 28.5 | 2.3 | 37.3 | — | 4.03 | 0.66 |
| Comp. Ex. 2 | 324 | 35.1 | 3.1 | 27.6 | — | 4.09 | 0.53 |
| Comp. Ex. 3 | 319 | 33.4 | 3.0 | 29.5 | — | 4.10 | 0.46 |
| Comp. Ex. 4 | 338 | 21.7 | 2.4 | 36.1 | — | 4.07 | 0.82 |
| Comp. Ex. 5 | 305 | 25.3 | 2.1 | 40.8 | — | 4.05 | 0.83 |
| Comp. Ex. 6 | 264 | 25.0 | 2.65 | 30.0 | 0.192 | 4.03 | 0.75 |
| Comp. Ex. 7 | 383 | 27.0 | 2.57 | 30.9 | 0.201 | 4.03 | 0.83 |
| Comp. Ex. 8 | 245 | 24.0 | 3.00 | 26.5 | 0.181 | 4.01 | 0.63 |
| Comp. Ex. 9 | 371 | 31.0 | 3.10 | 25.6 | 0.194 | 4.00 | 0.62 |

| | | Results | | | |
|---|---|---|---|---|---|
| | (221)/(021) | 1000 mA high rate discharge characteristic (%) | OCV (V) | 1 Watt discharge characteristic (mAh/g) | Note |
| Ex. 1 | 1.17 | — | 1.674 | 70.4 | |
| Ex. 2 | 1.17 | 122* | — | — | |
| Ex. 3 | 1.18 | — | — | — | |
| Ex. 4 | 1.18 | 110* | — | — | |
| Ex. 5 | 1.10 | 111* | 1.684 | 76.1 | |
| Ex. 6 | 1.00 | — | — | — | |
| Ex. 7 | 1.02 | — | — | — | Product electrodeposited on the anode side |
| Ex. 8 | 1.21 | — | — | — | Product electrodeposited on the electrolyte side |
| Ex. 9 | 1.21 | — | 1.682 | 72.8 | |
| Ex. 10 | 1.15 | — | — | — | |
| Ex. 11 | 1.00 | 102** | — | — | |
| Ex. 12 | 1.00 | 112** | — | — | |
| Ex. 13 | 0.94 | 108** | — | — | |
| Ex. 14 | 1.01 | 115** | 1.715 | 76.9 | |
| Ex. 15 | 1.05 | 102** | — | — | |
| Comp. Ex. 1 | 1.32 | 100* | 1.635 | 67.6 | |
| Comp. Ex. 2 | 1.10 | — | — | — | Exfoliation of electrodeposited product occurred |
| Comp. Ex. 3 | 1.05 | — | — | — | Carbon plate was used as anode |
| Comp. Ex. 4 | 1.24 | — | — | — | |
| Comp. Ex. 5 | 1.19 | 104* | — | — | |
| Comp. Ex. 6 | 0.99 | 100** | — | — | |
| Comp. Ex. 7 | 1.04 | 105** | — | — | |
| Comp. Ex. 8 | 0.96 | 90** | — | — | |
| Comp. Ex. 9 | 0.94 | 95** | — | — | |

*Relative discharge rate based on Comparative Example 1 being 100%.
**Relative discharge rate based on Comparative Example 6 being 100%.

TABLE 2

| Nickel oxyhydroxide (wt %) | Eluted Mn amount* (mol %) |
|---|---|
| 0 | 0.057 |
| 1 | 0.014 |
| 5 | trace |

*The eluted Mn amount is represented by the eluted amount relative to Mn in the cathode material.

The entire disclosures of Japanese Patent Application No. 2007-034066 filed on Feb. 14, 2007, Japanese Patent Application No. 2007-291038 filed on Nov. 8, 2007 and Japanese Patent Application No. 2007-291039 filed on Nov. 8, 2007 including specifications, claims, drawings and summaries are incorporated herein by reference in their entireties.

What is claimed is:

1. Electrolytic manganese dioxide characterized in that the alkali potential is at least 310 mV, the full width at half maximum (FWHM) of the (110) plane in the XRD measurement using CuKa line as the light source is at least 2.2° and at most 3.0°, and the (110)/(021) peak intensity ratio in the X-ray diffraction peaks is at least 0.5° and at most 0.80, and the discharge capacity is at least 70 mAh/g wherein the discharge capacity is calculated based on the amount of discharge current of an AA type battery under a load of 1 watt until the voltage reaches a cut-off voltage of 0.9V, and wherein the electrolytic manganese dioxide is produced by electrolysis in an aqueous solution of sulfuric acid/manganese sulfate mixture, wherein the concentration of sulfuric acid in the aqueous solution at the initiation of the electrolysis is from 25 to 40g/L, and the concentration of sulfuric acid at the later stage of the electrolysis is higher than 40 g/L and up to 75 g/L.

2. The electrolytic manganese dioxide according to claim 1, wherein the (110)/(021) peak intensity ratio in the X-ray diffraction peaks is at least 0.53 and at most 0.80.

3. The electrolytic manganese dioxide according to claim 1, wherein the alkali potential is at least 350 mV and at most 400 mV, and the molar ratio of structural water contained ($H_2O/MnO2$) is at least 0.20.

4. The electrolytic manganese dioxide according to claim 1, wherein the (221)/(021) peak intensity ratio in the X-ray diffraction peaks is at least 0.65.

5. The electrolytic manganese dioxide according to claim 1, wherein the (110) interplanar spacing in the X-ray diffraction peaks is at least 4.00 Å and at most 4.06 Å.

6. The electrolytic manganese dioxide according to claim 1, wherein the BET specific surface area is at least 22 m2/g and at most 32 m2/g.

7. A cathode active material for an electric cell containing the electrolytic manganese dioxide as defined in claim 1.

8. The cathode active material for an electric cell according to claim 7, which further contains at least 0.1 wt % and at most 10 wt % of nickel oxyhydroxide.

9. An electric cell containing the cathode active material as defined in claim 7.

10. The electric cell according to claim 9, which is a LR6 model electric cell as defined in JIS C8511, wherein the open circuit voltage (OCV) before discharge exceeds 1.649 V.

11. The electrolytic manganese dioxide according to claim 1, wherein the alkali potential is at least 313 mV.

12. The electrolytic manganese dioxide according to claim 1, wherein the alkali potential is at least 315 mV.

13. The electrolytic manganese dioxide according to claim 1, wherein the alkali potential is at least 319 mV.

14. The electrolytic manganese dioxide according to claim 1, wherein the alkali potential is at least 325 mV.

15. Electrolytic manganese dioxide according to claim 1 further characterized in that the alkali potential is at least 319 mV, the full width at half maximum (FWHM) of the (110) plane in the XRD measurement using CuKa line as the light source is at least 2.2° and at most 3.0°, and the (110)/(021) peak intensity ratio in the X-ray diffraction peaks is at least 0.50 and at most 0.80.

16. The electrolytic manganese dioxide according to claim 15, wherein the alkali potential is at least 325 mV.

17. The electrolytic manganese dioxide according to claim 15, wherein the alkali potential is at least 350 mV and at most 400 mV.

18. Electrolytic manganese dioxide according to claim 1 wherein the alkali potential is at least 310 mV, the full width at half maximum (FWHM) of the (110) plane in the XRD measurement using CuKa line as the light source is at least 2.2° and at most 2.9°, and the (110)/(021) peak intensity ratio in the X-ray diffraction peaks is at least 0.50 and at most 0.80, and the discharge capacity is at least 70 mAh/g wherein the discharge capacity is calculated based on the amount of discharge current of an AA type battery under a load of 1 watt until the voltage reaches a cut-off voltage of 0.9V.

* * * * *